United States Patent
Lee et al.

(10) Patent No.: US 9,740,652 B2
(45) Date of Patent: Aug. 22, 2017

(54) APPARATUS AND METHOD FOR CONTROLLING TRANSPARENT TUNNEL MODE OPERATION IN COMMUNICATION SYSTEM SUPPORTING WIRELESS DOCKING PROTOCOL

(71) Applicant: Samsung Electronics Co., Ltd., Gyeonggi-do (KR)

(72) Inventors: Jong-Hyo Lee, Gyeonggi-do (KR); Karthik Srinivasa Gopalan, Bangalore (IN); Kiran Bharadwaj Vedula, Bangalore (IN); Jun-Hyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/286,178

(22) Filed: May 23, 2014

(65) Prior Publication Data
US 2014/0351602 A1 Nov. 27, 2014

Related U.S. Application Data

(60) Provisional application No. 61/826,685, filed on May 23, 2013.

(51) Int. Cl.
*G06F 13/40* (2006.01)
*H04L 29/06* (2006.01)
(Continued)

(52) U.S. Cl.
CPC ........ *G06F 13/4081* (2013.01); *H04L 63/029* (2013.01); *H04L 63/04* (2013.01);
(Continued)

(58) Field of Classification Search
CPC ... H04L 63/029; H04L 63/04; G06F 13/4081; H04W 12/02; H04W 12/04; H04W 84/12
See application file for complete search history.

(56) References Cited

U.S. PATENT DOCUMENTS 6,256,733 B1 * 7/2001 Thakkar ............... H04L 9/0822
380/277
8,254,992 B1 * 8/2012 Ashenbrenner et al. ..... 455/557
(Continued)

FOREIGN PATENT DOCUMENTS

WO WO 2013/038359 3/2013

*Primary Examiner* — Robert Leung
(74) *Attorney, Agent, or Firm* — The Farrell Law Firm, P.C.

(57) ABSTRACT

A method for controlling a transparent tunnel mode operation in a Wireless Dockee (WD) in a communication system supporting a wireless docking protocol is provided. The method includes performing a group join process and a provisioning process for security keys with a Wireless Docking Center (WDC); accessing services of a Wireless Docking Environment (WDN); selecting an operating mode between the WD and the WDC as a transparent tunnel mode; performing a process of getting information related to a peripheral with the WDC; requesting the WDC to enable a monitor mode and a promiscuous mode; and transmitting/receiving a data packet using the information related to the peripheral with the peripheral if a Miracast connection and a docking session are established between the WD and the peripheral.

64 Claims, 6 Drawing Sheets

(51) Int. Cl.
*H04W 12/02* (2009.01)
*H04W 12/04* (2009.01)
*H04W 84/12* (2009.01)

(52) U.S. Cl.
CPC ........... *H04W 12/02* (2013.01); *H04W 12/04* (2013.01); *H04L 63/0464* (2013.01); *H04L 63/0471* (2013.01); *H04L 2209/24* (2013.01); *H04W 84/12* (2013.01)

(56) References Cited

U.S. PATENT DOCUMENTS

| | | |
|---|---|---|
| 2007/0097934 A1* | 5/2007 | Walker et al. ................ 370/338 |
| 2008/0075295 A1* | 3/2008 | Mayman et al. ............... 381/79 |
| 2008/0313455 A1 | 12/2008 | Kroeselberg |
| 2010/0166186 A1* | 7/2010 | Shiba ................... H04L 9/0844 380/278 |
| 2011/0103264 A1 | 5/2011 | Wentink |
| 2012/0155643 A1 | 6/2012 | Hassan et al. |
| 2012/0265913 A1* | 10/2012 | Suumaki et al. ............. 710/303 |
| 2013/0016032 A1* | 1/2013 | Margulis ........................ 345/2.3 |
| 2013/0038359 A1 | 2/2013 | Zhang |
| 2013/0064198 A1 | 3/2013 | Krishnaswamy et al. |
| 2013/0080676 A1* | 3/2013 | Mifsud ................. G06F 3/0231 710/304 |
| 2013/0311692 A1* | 11/2013 | Huang et al. ................ 710/303 |
| 2013/0311694 A1* | 11/2013 | Bhamidipati et al. ........ 710/303 |
| 2014/0120829 A1* | 5/2014 | Bhamidipati et al. ....... 455/3.06 |
| 2014/0146745 A1* | 5/2014 | Huang et al. ................ 370/328 |

* cited by examiner

APPARATUS AND METHOD FOR CONTROLLING TRANSPARENT TUNNEL MODE OPERATION IN COMMUNICATION SYSTEM SUPPORTING WIRELESS DOCKING PROTOCOL

PRIORITY

This application claims priority under 35 U.S.C. §119(e) to a U.S. Provisional Patent Application Ser. No. 61/826,685, which was filed in the United States Patent and Trademark Office on May 23, 2013, the entire content of which is incorporated herein by reference.

BACKGROUND OF THE INVENTION

1. Field of the Invention

The present invention relates generally to an apparatus and method for controlling a transparent tunnel mode operation in a communication system supporting a wireless docking protocol, and more particularly, to an apparatus and method for controlling a transparent tunnel mode operation to share wireless docking related information for peripherals in a communication system supporting a wireless docking protocol.

2. Description of the Related Art

In a docking operation, such as those performed in office environments, for example, a dockee (e.g., a laptop) is docked to a docking center in order to enhance a user experience by providing connectivity between the dockee and peripherals (e.g., a mouse, a keyboard, and a display).

The docking center may also provide additional ports, such as a Universal Serial Bus (USB) port. Recently, high-speed home networking schemes, such as Wimedia scheme and Wireless-Fidelity (Wi-Fi) networking schemes, have been proposed, in which the docking operation may be implemented wirelessly through such home networking schemes. In the Wimedia and Wi-Fi networking schemes, the dockee and the docking center communicate based on the wireless networking scheme.

A Wi-Fi docking standard defines mechanisms that support a docking operation for various wired and wireless peripherals. The mechanisms defined in the Wi-Fi docking standard may be performed through a Wi-Fi direct Peer to Peer (P2P) protocol and/or in an infrastructure mode operation.

A Wi-Fi docking architecture proposed in the Wi-Fi docking standard is described below.

The Wi-Fi docking architecture defines three roles (i.e., a Wireless Dockee (WD), a Wireless Docking Center (WDC), and a peripheral). The WD consumes a service The WDC operates as a dock with respect to at least one peripheral and enables docking. The peripheral provides a specific service to the WD.

Peripherals may be grouped into a Wireless Docking Environment (WDN). A plurality of WDNs may be included in one Wi-Fi direct P2P group. The Wi-Fi direct P2P group includes a Group Owner (GO), which is similar to an Access Point (AP), and also includes group client devices, which are similar to STAtion (STA) devices in the infrastructure mode.

The GO transmits a beacon signal on a specific operating channel, and may be discovered by group client devices. Upon discovering the GO, the group client devices may join a group through a group join procedure. As a part of the group join process, the GO initiates a provisioning process, which provides security keys to the group client devices. The security keys are used for a secure communication within the group.

The Wi-Fi direct P2P protocol mandates use of a Wi-Fi Protected Access Version 2 (WPA2) personal mode of operation for securing communication among the group client devices included in the Wi-Fi direct P2P group. The WPA2 scheme defines two key types: a Pairwise Transient Key (PTK) used for unicast transmissions that is specific to a GO/AP and a P2P client/client STA pair, and a Group Transient Key (GTK) used for multicast and broadcast communications in the Wi-Fi direct P2P group.

A Wi-Fi display standard defines mechanisms for a mirroring operation between a source device and a sink device. The source device captures, encodes, packetizes, and streams content being played to the sink device. The sink device de-packetizes, decodes and displays the content on either the sink device or a display connected to the sink device.

Before performing the aforementioned operations, the source device and the sink device discover each other, get connected to each other using a Wi-Fi direct P2P scheme, and inform each other about their respective capabilities through a capability negotiation operation.

The wireless docking protocol, which supports the WDC, supports a two-hop protocol between the WD (a device that requires a service/functionality) and the peripheral (a device that provides the service/functionality) as an intermediate hop in a topology. The wireless docking protocol inherently runs through a Wi-Fi direct P2P connection. The Wi-Fi direct P2P connection supports a WPA2 personal mode security operation.

The WPA2 personal mode security operation supports a PTK per peripheral used for unicast transmissions and a GTK used for multicast and broadcast transmissions in the Wi-Fi direct P2P group. However, a wireless docking scheme introduces a WDN, which is a group that includes peripherals, a WDC, and a WD. There may be a plurality of WDNs in the Wi-Fi direct P2P group.

A wireless docking environment supports Wi-Fi display use. A Miracast protocol is a protocol defined by a Wi-Fi alliance for this purpose, i.e., the Wi-Fi display use. The Miracast protocol is a single hop protocol with a termination entity (a Miracast sink device) at an end of a link. Accordingly, there is a need for a scheme to run a single hop protocol through a 2 hop topology. A detailed description of such a scheme is provided herein below.

It is possible to implement a proxy based solution on a WDC, thereby processing the two hop topology as two single hop topologies, through two Miracast sessions. Here, one of the two Miracast sessions is a Miracast session between a Miracast source device on a WD and a proxy Miracast sink device on the WDC, and other of the two Miracast sessions is a Miracast session between a proxy Miracast source device on the WDC and an actual Miracast sink device on a peripheral.

Two issues that occur when the proxy based solution is used on the WDC are described below.

The first issue is that there is a decryption process and an encryption process on the WDC.

The second issue is that an Internet Protocol (IP) address remapping process needs to be performed per each data packet, if a data packet is forwarded from the proxy Miracast sink device to the proxy Miracast source device.

Both the first issue and the second issue may have an impact on latency sensitive flows.

Therefore, there is a need for overcoming latency issues when a communication system supporting a wireless docking protocol operates in a proxy mode, while at the same time supporting deployment of single hop protocols.

The above information is merely presented as background information only to assist with an understanding of the present invention. No determination has been made, and no assertion is made, as to whether any of the above might be applicable as prior art with regard to the present invention.

SUMMARY OF THE INVENTION

The present invention is designed to address at least the above-mentioned problems and/or disadvantages and to provide at least the advantages described below.

Accordingly, an aspect of the present invention is to provide an apparatus and method for controlling a transparent tunnel mode operation in a communication system supporting a wireless docking protocol.

Another aspect of the present invention is to provide an apparatus and method for controlling a transparent tunnel mode operation to share wireless docking related information for peripherals in a communication system supporting a wireless docking protocol.

Another aspect of the present invention is to provide an apparatus and method for controlling a transparent tunnel mode operation thereby a WD and peripherals share an IP address in a communication system supporting a wireless docking protocol.

Another aspect of the present invention is to provide an apparatus and method for controlling a transparent tunnel mode operation thereby a WD and peripherals share a PTK in a communication system supporting a wireless docking protocol.

Another aspect of the present invention is to provide an apparatus and method for controlling a transparent tunnel mode operation thereby a WD and peripherals share a Wireless Docking Environment (WDN) Transient Key (WTK) in a communication system supporting a wireless docking protocol.

In accordance with an aspect of the present invention, there is provided a method for controlling a transparent tunnel mode operation in a Wireless Dockee (WD) in a communication system supporting a wireless docking protocol, the method including: performing a group join process and a provisioning process for security keys with a Wireless Docking Center (WDC); accessing services of a Wireless Docking Environment (WDN); selecting an operating mode between the WD and the WDC as a transparent tunnel mode; performing a process of getting information related to a peripheral with the WDC; requesting the WDC to enable a monitor mode and a promiscuous mode; and transmitting/receiving a data packet using the information related to the peripheral with the peripheral if a Miracast connection and a docking session are established between the WD and the peripheral.

In accordance with another aspect of the present invention, there is provided a method for controlling a transparent tunnel mode operation in a Wireless Docking Center (WDC) in a communication system supporting a wireless docking protocol, the method including: performing a group join process and a provisioning process for security keys with a Wireless Dockee (WD) and a peripheral; performing a process related to an operation in which the WD accesses services of a Wireless Docking Environment (WDN) with the WD; selecting an operating mode between the WD and the WDC as a transparent tunnel mode; performing a process of getting information related to a peripheral with the WD; providing information related to the WD to the peripheral; enabling a monitor mode and a promiscuous mode upon receiving a message which requests to enable the monitor mode and the promiscuous mode; and transmitting/receiving a data packet using the information related to the WD and the information related to the peripheral with the WD and the peripheral if a Miracast connection and a docking session are established between the WD and the peripheral.

In accordance with another aspect of the present invention, there is provided a method for controlling a transparent tunnel mode operation in a peripheral in a communication system supporting a wireless docking protocol, the method including: performing a group join process and a provisioning process for security keys with a Wireless Docking Center (WDC); receiving information related to the WD from the WDC; transmitting/receiving a data packet using the information related to the WD with the WD if a Miracast connection and a docking session are established between the WD and the peripheral.

In accordance with another aspect of the present invention, there is provided a method for controlling a transparent tunnel mode operation in a Wireless Dockee (WD) in a communication system supporting a wireless docking protocol, the method including: performing a group join process and a provisioning process for security keys with a Wireless Docking Center (WDC); accessing services of a Wireless Docking Environment (WDN); selecting an operating mode between the WD and the WDC as a transparent tunnel mode; performing a process of getting information related to a peripheral and information related to the WDN with the WDC; and transmitting/receiving a data packet using the information related to the WDN with the peripheral if a Miracast connection and a docking session are established between the WD and the peripheral.

In accordance with another aspect of the present invention, there is provided a method for controlling a transparent tunnel mode operation in a Wireless Docking Center (WDC) in a communication system supporting a wireless docking protocol, the method including: performing a group join process and a provisioning process for security keys with a Wireless Dockee (WD) and a peripheral; provisioning information related to a Wireless Docking Environment (WDN) to the peripheral; performing a process related to an operation in which the WD accesses services of the WDN with the WD; selecting an operating mode between the WD and the WDC as a transparent tunnel mode; performing a process of getting information related to a peripheral and information related to the WDN with the WD; and transmitting/receiving a data packet using the information related to the WDN with the WD and the peripheral if a Miracast connection and a docking session are established between the WD and the peripheral.

In accordance with another aspect of the present invention, there is provided a method for controlling a transparent tunnel mode operation in a peripheral in a communication system supporting a wireless docking protocol, the method including: performing a group join process and a provisioning process for security keys with a Wireless Docking Center (WDC); receiving information related to a Wireless Docking Environment (WDN) from the WDC; transmitting/receiving a data packet using the information related to the WDN with the WD if a Miracast connection and a docking session are established between the WD and the peripheral.

In accordance with another aspect of the present invention, there is provided a Wireless Dockee (WD) in a communication system supporting a wireless docking protocol, the WD including: a transmitter; a receiver; and a controller, wherein the controller controls the transmitter and the receiver to perform a group join process and a provisioning process for security keys with a Wireless Docking Center (WDC) and access services of Wireless Docking Environment (WDN), selects an operating mode between the WD and the WDC as a transparent tunnel mode, and controls the transmitter and the receiver to perform a process of getting information related to a peripheral with the WDC, wherein the transmitter requests the WDC to enable a monitor mode and a promiscuous mode, and wherein the controllers controls the transmitter and the receiver to transmit/receive a data packet using the information related to the peripheral with the peripheral if a Miracast connection and a docking session are established between the WD and the peripheral.

In accordance with another aspect of the present invention, there is provided a Wireless Docking Center (WDC) in a communication system supporting a wireless docking protocol, the WDC including: a transmitter; a receiver; and a controller, wherein the controller controls the transmitter and the receiver to perform a group join process and a provisioning process for security keys with a Wireless Dockee (WD) and perform a process related to an operation in which the WD accesses services of a Wireless Docking Environment (WDN) with the WD, selects an operating mode between the WD and the WDC as a transparent tunnel mode, and controls the transmitter and the receiver to perform a process of getting information related to a peripheral with the WD, wherein the transmitter provides information related to the WD to the peripheral, wherein the controller enables a monitor mode and a promiscuous mode if the receiver receives a message which requests to enable the monitor mode and the promiscuous mode, and wherein the controller controls the transmitter and the receiver to transmit/receive a data packet using the information related to the WD and the information related to the peripheral with the WD and the peripheral if a Miracast connection and a docking session are established between the WD and the peripheral.

In accordance with another aspect of the present invention, there is provided a peripheral in a communication system supporting a wireless docking protocol, the peripheral including: a transmitter; a receiver; and a controller, wherein the controller controls the transmitter and the receiver to perform a group join process and a provisioning process for security keys with a Wireless Docking Center (WDC), wherein the receiver receives information related to the WD from the WDC, and wherein the controller controls the transmitter and the receiver to transmit/receive a data packet using the information related to the WD with the WD if a Miracast connection and a docking session are established between the WD and the peripheral.

In accordance with another aspect of the present invention, there is provided a Wireless Dockee (WD) in a communication system supporting a wireless docking protocol, the WD including: a transmitter; a receiver; and a controller, wherein the controller controls the transmitter and the receiver to perform a group join process and a provisioning process for security keys with a Wireless Docking Center (WDC) and access services of Wireless Docking Environment (WDN), selects an operating mode between the WD and the WDC as a transparent tunnel mode, and controls the transmitter and the receiver to perform a process of getting information related to a peripheral and information related to the WDN with the WDC and transmit/receive a data packet using the information related to the WDN with the peripheral if a Miracast connection and a docking session are established between the WD and the peripheral.

In accordance with another aspect of the present invention, there is provided a Wireless Docking Center (WDC) in a communication system supporting a wireless docking protocol, the WDC including: a transmitter; a receiver; and a controller, wherein the controller controls the transmitter and the receiver to perform a group join process and a provisioning process for security keys with a Wireless Dockee (WD) and a peripheral, wherein the transmitter provisions information related to a Wireless Docking Environment (WDN) to the peripheral; wherein the controller controls the transmitter and the receiver to perform a process related to an operation in which the WD accesses services of the WDN with the WD, selects an operating mode between the WD and the WDC as a transparent tunnel mode, and controls the transmitter and the receiver to perform a process of getting information related to a peripheral and information related to the WDN with the WD and transmit/receive a data packet using the information related to the WDN with the WD and the peripheral if a Miracast connection and a docking session are established between the WD and the peripheral.

In accordance with another aspect of the present invention, there is provided a peripheral in a communication system supporting a wireless docking protocol, the peripheral including: a transmitter; a receiver; and a controller, wherein the controller controls the transmitter and the receiver to perform a group join process and a provisioning process for security keys with a Wireless Docking Center (WDC), wherein the receiver receives information related to a Wireless Docking Environment (WDN) from the WDC, wherein the controller controls the transmitter and the receiver to transmit/receive a data packet using the information related to the WDN with the WD if a Miracast connection and a docking session are established between the WD and the peripheral.

Other aspects, advantages, and salient features of the present invention will become apparent to those skilled in the art from the following detailed description, which, taken in conjunction with the annexed drawings, describe embodiments of the present invention.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION

Figure 1:
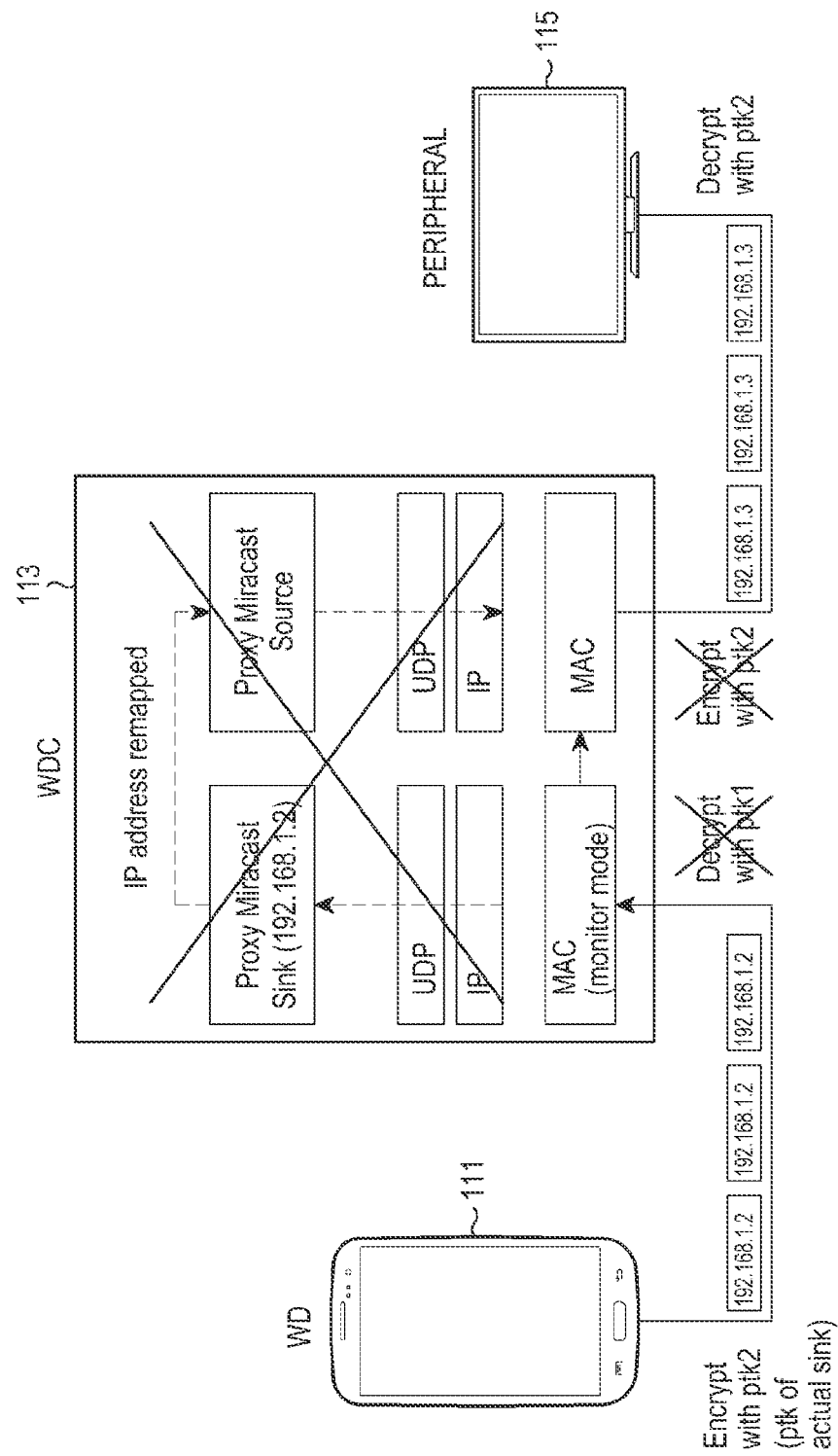
FIG. 1 is a diagram illustrating an example of a transparent tunnel mode operation which shares an IP address in a communication system supporting a wireless docking protocol according to an embodiment of the present invention.

The following description is provided with reference to the accompanying drawings to assist in a comprehensive understanding of various embodiments of the present invention, as defined by the claims and their equivalents. The following description includes various specific details to assist in that understanding but these are to be regarded as mere examples. Accordingly, various changes and modifications of the various embodiments described herein can be made without departing from the scope and spirit of the present invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present invention. Accordingly, the following description of various embodiments of the present invention is provided for illustration purposes only and not for the purpose of limiting the present invention, as defined by the appended claims and their equivalents.

Although ordinal numbers such as "first," "second," and so forth may be used to describe various components, those components are not limited herein, but these terms are merely used for distinguishing components from each other. For example, a first component may be referred to as a second component, and likewise, a second component may also be referred to as a first component, without departing from embodiments of the present invention. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. The terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

Throughout the drawings, it should be noted that like reference numbers are used to depict the same or similar elements, features, and structures.

An aspect of the present invention includes an apparatus and method for controlling a transparent tunnel mode operation in a communication system supporting a wireless docking protocol.

Another aspect of the present invention proposes an apparatus and method for controlling a transparent tunnel mode operation to share wireless docking related information for peripherals in a communication system supporting a wireless docking protocol.

Another aspect of the present invention includes an apparatus and method for controlling a transparent tunnel mode operation thereby a Wireless Dockee (WD) and peripherals share an Internet Protocol (IP) address in a communication system supporting a wireless docking protocol.

Another aspect of the present invention includes an apparatus and method for controlling a transparent tunnel mode operation thereby a WD and peripherals share a Pairwise Transient Key (PTK) in a communication system supporting a wireless docking protocol.

Another aspect of the present invention includes an apparatus and method for controlling a transparent tunnel mode operation thereby a WD and peripherals share a Wireless Docking Environment (WDN) Transient Key (WTK) in a communication system supporting a wireless docking protocol.

A method and apparatus proposed in various embodiments of the present invention may be applied to various communication systems, such as a Long Term Evolution (LTE) system, an LTE-Advanced (LTE-A) system, a High Speed Downlink Packet Access (HSDPA) mobile communication system, a High Speed Uplink Packet Access (HSUPA) mobile communication system, a High Rate Packet Data (HRPD) mobile communication system proposed in a $3^{rd}$ Generation Project Partnership 2 (3GPP2), a Wideband Code Division Multiple Access (WCDMA) mobile communication system proposed in the 3GPP2, a Code Division Multiple Access (CDMA) mobile communication system proposed in the 3GPP2, an Institute of Electrical and Electronics Engineers (IEEE) mobile communication system, an Evolved Packet System (EPS), a Mobile Internet Protocol (Mobile IP) system, etc.

An example of a transparent tunnel mode operation which shares an IP address in a communication system supporting a wireless docking protocol according to an embodiment of the present invention is described as follows with reference FIG. 1.

FIG. 1 is a diagram illustrating an example of a transparent tunnel mode operation that shares an IP address in a communication system supporting a wireless docking protocol according to an embodiment of the present invention.

Referring to FIG. 1, a single hop protocol for a Miracast scheme is deployed using the transparent tunnel mode operation.

The communication system includes a WD 111, a Wireless Docking Center (WDC) 113, and a peripheral 115. The peripheral 115 is a Miracast sink device. For convenience, in FIG. 1, a reference sign 115 denotes either a peripheral or a Miracast sink device.

The WDC 113 includes a Medium Access Control (MAC) layer, an IP layer, and a User Datagram Protocol (UDP) layer. In the present example, it will be assumed that the MAC layer operates in a monitor mode.

If the communication system operates in a normal proxy mode, there is a need for a data packet decryption process and a data packet encryption process on the WDC 113. Before a data packet is forwarded from the WDC 113 to the peripheral 115, there is a need for an IP address remapping process for a Miracast sink IP address of the Miracast sink device. The data packet decryption process, the data packet encryption process, and the IP address remapping process may result in a delay issue and a performance issue for latency sensitive flows.

According to an embodiment of the present invention, a transparent tunnel mode operation is proposed, and a detailed description of the transparent tunnel mode operation is described as follows.

If the communication system operates in a transparent tunnel mode, data packets that are received in the WD 111 from a Miracast source device are directly addressed to an IP address of the Miracast sink device 115, and the data packets are encrypted with a PTK/WDK as a security key of a WDN to which the peripheral 115 belongs. Here, the PTK is a PTK of the peripheral 115.

After decrypting the data packets, the WDC 113 does not re-encrypt the data packets, and does not perform an IP address remapping process. The WDC 113 forwards data packets that are received from the WD 111 to the peripheral 115. Accordingly, the transparent tunnel mode provides improved performance for latency sensitive flows compared to the normal proxy mode.

As the forwarding operation is at a Layer 2 (L2), additional stack overheads that occur in the normal proxy mode may be avoided.

With reference to FIG. 1, a basic concept of the transparent tunnel mode operation is explained based on the Miracast scheme. However, the transparent tunnel mode operation may be performed based on various one hop protocols, a Wireless Serial Bus (WSB) scheme, and other such protocols/schemes, as well as the Miracast scheme.

In FIG. 1, data packets are encrypted with a PTK, however, a WTK may be used for encrypting data packets instead of the PTK, if the WTK is supported in the transparent tunnel mode.

If the transparent tunnel mode in FIG. 1 is supported, the WD 111 and the peripheral 115 may share an IP address, so the WDC 113 does not need to perform a decryption process and an encryption process for data packets, and does not need to perform an IP address remapping process for each data packet.

Although FIG. 1 illustrates an example of a transparent tunnel mode operation that shares an IP address in a communication system supporting a wireless docking protocol according to an embodiment of the present invention, various changes could be made to the example FIG. 1 in accordance with embodiments of the present invention. For example, although shown as a series of operations, various operations in FIG. 1 could overlap, occur in parallel, occur in a different order, or occur multiple times.

Figure 2:
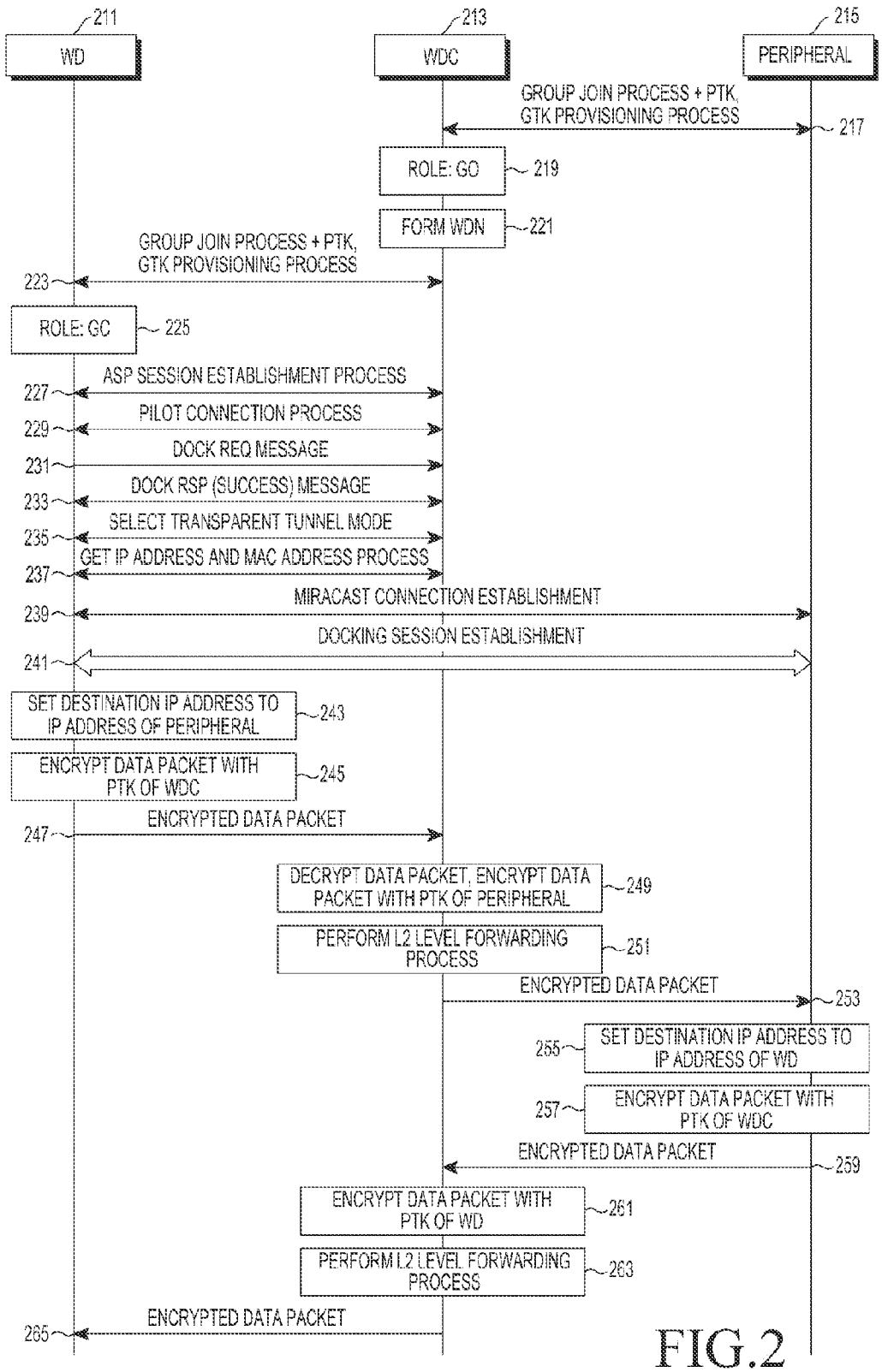
FIG. 2 is a diagram illustrating another example of a transparent tunnel mode operation which shares an IP address in a communication system supporting a wireless docking protocol according to an embodiment of the present invention.

FIG. 2 is a diagram illustrating another example of a transparent tunnel mode operation that shares an IP address in a communication system supporting a wireless docking protocol according to an embodiment of the present invention.

Referring to FIG. 2, the communication system includes a WD 211, a WDC 213, and a peripheral 215.

The peripheral 215 (e.g., a Miracast sink device) and the WD 211 (e.g., a Wi-Fi Serial Bus (WSB) mouse) are associated with the WDC 213. In the present example, it will be assumed that the WDC 213 is designated as a Group Owner (GO) of a Wi-Fi direct Peer to Peer (P2P) group, at step 219. The WDC 213 forms a WDN, at step 221. As a part of the association procedure, a group join process and a provisioning process for security keys such as a PTK and a GTK are performed between the WDC 213 and the peripheral 215, at step 217.

If the WD 211 discovers peripheral information and services provided by the WDC 213, a group join process and a provisioning process for security keys such as the PTK and the GTK are performed between the WD 211 and the WDC 213 as the GO, at step 223. The WD 211 as a group client device for the Wi-Fi direct P2P group performs the group join process, at step 225.

The WD 211 docks with the WDC 213 to access services of the WDN based on additional information provided during a post association discovery process. A detailed description of the operation in which the WD 211 accesses the services of the WDN will be followed.

An Application Service Platform (ASP) session establishment process is performed between the WD 211 and the WDC 213, at step 227. A pilot connection process is performed between the WD 211 and the WDC 213, at step 229. After performing the pilot connection process, the WD 211 transmits a Dock Request (Dock Req) message to the WDC 213, at step 231. After receiving the Dock Req message from the WD 211, the WDC 213 transmits a Dock Response (Dock Rsp) message as a response message to the Dock Req message to the WD 211, at step 233. The Dock Rsp message includes a success parameter.

After detecting docking confirmation for the WDC 213, the WD 211 selects the transparent tunnel mode operation, at step 235. The WD 211 may detect the docking confirmation for the WDC 213 according to the reception of the Dock Rsp message including the success parameter from the WDC 213. According to an embodiment of the present invention, the WD 211 selects the transparent tunnel mode operation. However, the WDC 213 may select the transparent tunnel mode operation in accordance with embodiments of the present invention.

After the transparent tunnel mode operation is selected, the WD 211 gets parameters which are necessary for the transparent tunnel mode operation, i.e., an IP address and a MAC address of the peripheral 215, and the like using a pilot protocol. Accordingly, the WD 211 performs a Get IP & MAC addresses process with the WDC 213, at step 237.

The WD 211 establishes a Miracast connection for the peripheral 215 using the IP address of the peripheral 215, at step 239. If the Miracast connection between the WD 211 and the peripheral 215 is established, an IP address re-mapping process that is required according to a normal proxy mode operation may be avoided.

Once the Miracast connection is established between the WD 211 and the peripheral 215, a docking session is established between the WD 211 and the peripheral 215, so a data packet transmission/reception is possible between the WD 211 and the peripheral 215, at step 241.

An operation of transmitting a data packet from the WD 211 to the peripheral 215 according to an embodiment of the present invention is described below.

If a data packet to be transmitted to the peripheral 215 occurs, the WD 211 sets a destination IP address of the data packet to an IP address of the peripheral 215, at step 243. The WD 211 encrypts the data packet with the PTK of the WDC 213 to generate an encrypted data packet, at step 245. The WD 211 transmits the encrypted data packet to the WDC 213, at step 247.

After receiving the encrypted data packet from the WD 211, the WDC 213 performs a decryption operation on the encrypted data packet. That is, the WDC 213 decrypts the encrypted data packet with the PTK of the WDC 213 to recover the data packet. The WDC 213 encrypts the data packet with the PTK of the peripheral 215 to generate an encrypted data packet, at step 249.

The WDC 213 performs an L2 level forwarding process of the data packet for the peripheral 215 based on the MAC address of the peripheral 215 included in the encrypted data packet, at step 251. After performing the L2 level forwarding process, the WDC 213 transmits the encrypted data packet to the peripheral 215, at step 253. Accordingly, if the WD 211 transmits the data packet which targets the peripheral 215, the WDC 213 performs an intermediate decryption operation and a re-encryption operation for the data packet.

An operation of transmitting a data packet from the peripheral 215 to the WD 211 is described as follows.

Firstly, the operation of transmitting the data packet from the peripheral 215 to the WD 211 is performed in a similar manner as the operation of transmitting the data packet from the peripheral 215 to the WD 211. More specifically, the WDC 213 forwards the data packet to be transmitted from the peripheral 215 to the WD 211 from the peripheral 215 to the WD 211 based on the MAC address of the WD 211. A detailed description for this is described in further detail later herein.

If a data packet to be transmitted to the WD 211 occurs, the peripheral 215 sets a destination IP address of the data packet to an IP address of the WD 211, at step 255. The peripheral 215 encrypts the data packet with the PTK of the WDC 213 to generate an encrypted data packet, at step 257. The peripheral 215 transmits the encrypted data packet to the WDC 213, at step 259.

After receiving the encrypted data packet from the peripheral 215, the WDC 213 performs a decryption operation on the encrypted data packet. More specifically, the WDC 213 decrypts the encrypted data packet with the PTK of the WDC 213 to recover the data packet. The WDC 213 encrypts the data packet with the PTK of the WD 211 to generate an encrypted data packet, at step 261. The WDC 213 performs an L2 level forwarding process of the data packet for the WD 211 based on the MAC address of the WD 211 included in the encrypted data packet, at step 263. After performing the L2 level forwarding process, the WDC 213 transmits the encrypted data packet to the WD 211, at step 265. More specifically if the peripheral 215 transmits the data packet which targets the WD 211, the WDC 213 performs an intermediate decryption operation and a re-encryption operation for the data packet.

Although FIG. 2 illustrates another example of a transparent tunnel mode operation which shares an IP address in a communication system supporting a wireless docking protocol according to an embodiment of the present invention, various changes could be made to the example according to FIG. 2. For example, although shown as a series of operations, various operations in FIG. 2 could overlap, occur in parallel, occur in a different order, or occur multiple times in accordance with embodiments of the present invention.

Figure 3:
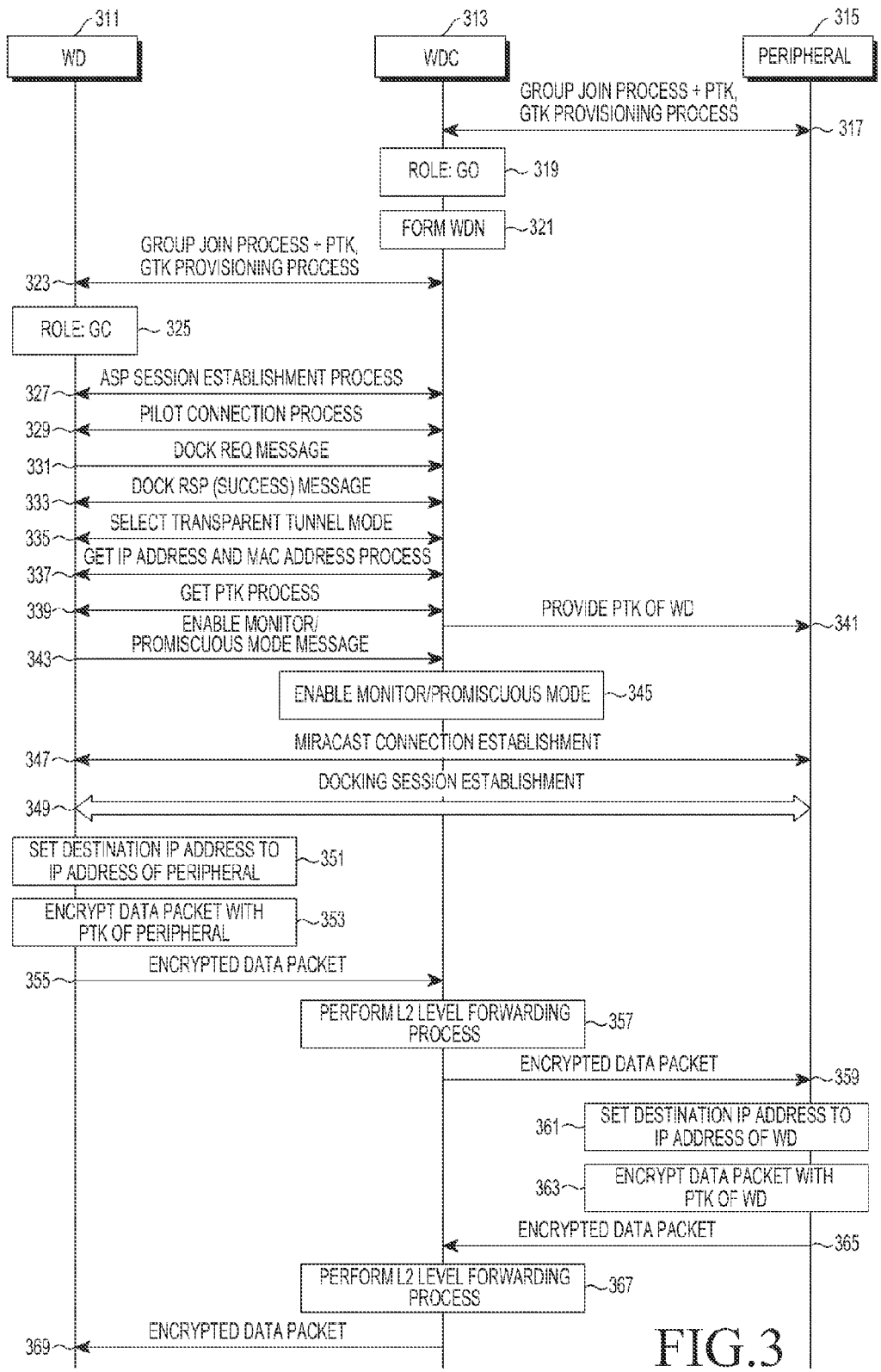
FIG. 3 is a diagram illustrating a transparent tunnel mode operation which shares an IP address and a PTK, and uses a monitor mode in a communication system supporting a wireless docking protocol according to an embodiment of the present invention.

FIG. 3 is a diagram illustrating a transparent tunnel mode operation that shares an IP address and a PTK, and uses a monitor mode in a communication system supporting a wireless docking protocol according to an embodiment of the present invention.

Referring to FIG. 3, the communication system includes a WD 311, a WDC 313, and a peripheral 315.

The transparent tunnel mode operation in FIG. 3 is an optimized transparent tunnel mode operation that shares an IP address, and a transparent tunnel mode operation for the peripheral 315 is combined with a monitor/promiscuous mode operation which is enabled in the WDC 313.

Generally, in a proxy normal mode operation, a data packet transmitted from the WD 311 will be encrypted with a PTK of the WDC 313, and the WDC 313 must decrypt and re-encrypt the data packet with a PTK of the peripheral 315 before forwarding the data packet. An input data packet that is not encrypted with the PTK of the peripheral 315 in the WDC 313 will be dropped by the WDC 313. However, when a Wi-Fi interface of the WDC 313 is implemented in a monitor/promiscuous mode, even though a data packet is not encrypted with the PTK of the peripheral 315, the data packet will not be dropped. The data packet that is encrypted in the WDC 313 will be picked up by the WDC 313, and transmitted to a custom interface handler (not shown in FIG. 3). This allows the data packets to be encrypted with a PTK of an end peripheral (i.e., the PTK of the peripheral 315) instead of the PTK of the WDC 313. The custom interface handler may directly forward the encrypted packets to the MAC address of the peripheral 315 without a decrypt operation and a re-encrypt operation for the data packets.

A detailed description of the transparent tunnel mode operation is described as follows.

The peripheral 315 (e.g., a Miracast sink device) and the WD 311 (e.g., a WSB mouse) perform an association process with the WDC 313. In the present example, the WDC 313 is designated as a GO of a Wi-Fi direct P2P group, at step 319. The WDC 313 forms a WDN, at step 321. As a part of the association procedure, a group join process and a provisioning process for security keys such as a PTK and a GTK are performed between the WDC 313 and the peripheral 315, at step 317.

If the WD 311 discovers peripheral information and services provided by the WDC 313, a group join process and a provisioning process for security keys such as the PTK and the GTK are performed between the WD 311 and the WDC 313 as the GO, at step 323. The WD 311 as a group client device for the Wi-Fi direct P2P group performs the group join process, at step 325.

The WD 311 docks with the WDC 313 to access services of the WDN based on additional information provided during a post association discovery process. A detailed description of the operation in which the WD 311 accesses the services of the WDN is described as follows.

An ASP session establishment process is performed between the WD 311 and the WDC 313, at step 327. A pilot connection process is performed between the WD 311 and the WDC 313, at step 329. After performing the pilot connection process, the WD 311 transmits a Dock Req message to the WDC 313, at step 331. After receiving the Dock Req message from the WD 311, the WDC 313 transmits a Dock Rsp message, as a response message to the Dock Req message, to the WD 311, at step 333. The Dock Rsp message includes a success parameter.

After detecting docking confirmation for the WDC 313, the WD 311 selects the transparent tunnel mode operation, at step 335. The WD 311 may detect the docking confirmation for the WDC 313 according to the reception of the Dock Rsp message including the success parameter from the WDC 313. According to an embodiment of the present invention, the WD 311 selects the transparent tunnel mode operation. However, the WDC 313 may select the transparent tunnel mode operation in accordance with embodiments of the present invention.

After the transparent tunnel mode operation is selected, the WD 311 gets parameters which are necessary for the transparent tunnel mode operation, i.e., an IP address and a MAC address of the peripheral 315, and the PTK of the peripheral 315 using a pilot protocol. Accordingly, the WD 311 performs a Get IP & MAC addresses process with the WDC 313, at step 337, and performs a Get PTK process with the WDC 313, at step 339.

The PTK of the WD 311 is provided to the peripheral 315 by the WDC 313, at step 341, in order for the peripheral 315 to directly communicate with the WD 311 through the WDC 313.

The WD 311 establishes a Miracast connection for the peripheral 315 using the IP address of the peripheral 315, at step 347. If the Miracast connection between the WD 311 and the peripheral 315 is established, an IP address re-mapping process that is required in certain other circumstances may be avoided.

The WD 311 transmits an enable monitor/promiscuous mode message that is used to request enabling a monitor/promiscuous mode of operation to the WDC 313, at step 343. After receiving the enable monitor/promiscuous mode message from the WD 311, the WDC 313 enables the monitor/promiscuous mode, so the enable monitor/promiscuous mode operation is enabled, at step 345. According to an embodiment of the present invention, after the monitor/promiscuous mode operation is enabled, the transparent tunnel mode operation is set up. However, the monitor/promiscuous mode operation may be enabled after the transparent tunnel mode operation is set up, in accordance with embodiments of the present invention.

By enabling the monitor mode/promiscuous mode of operation, an intermediate decryption process and an encryption process on the WDC 313 may be avoided.

After the Miracast connection is established between the WD 311 and the WDC 313, a docking session is established between the WD 311 and the peripheral 315, and packet data transmission/reception is enabled between the WD 311 and the peripheral 315, at step 349.

An operation of transmitting a data packet from the WD 311 to the peripheral 315 according to an embodiment of the present invention is described below.

If there is a data packet to be transmitted to the peripheral 315, the WD 311 sets a destination IP address of the data packet to an IP address of the peripheral 315, at step 351. The WD 311 encrypts the data packet with the PTK of the peripheral 315 to generate an encrypted data packet, at step 353. The WD 311 transmits the encrypted data packet to the WDC 313, at step 355.

The WDC 313 performs an L2 level forwarding process of the data packet for the peripheral 315 based on the MAC address of the peripheral 315 included in the encrypted data packet, at step 357). If the monitor mode is enabled on the WDC 313, the WDC 313 will not perform an intermediate decryption operation and a re-encryption operation for the data packet. Instead, the encrypted data packet is directly forwarded to the peripheral 315 based on the MAC address of the peripheral 315, at step 359.

An operation of transmitting a data packet from the peripheral 315 to the WD 311 is performed in a similar manner as the operation of transmitting the data packet from the WD 311 to the peripheral 315. More specifically, the WDC 313 forwards the data packet to be transmitted from the peripheral 315 to the WD 311 from the peripheral 315 to the WD 311 based on the MAC address of the WD 311.

A further detailed description of this transmission of a data packet is provided later herein.

If a data packet to be transmitted to the WD 311 occurs, the peripheral 315 sets a destination IP address of the data packet to an IP address of the WD 311, at step 361. The peripheral 315 encrypts the data packet with the PTK of the WDC 313 to generate an encrypted data packet, at step 363. The peripheral 315 transmits the encrypted data packet to the WDC 313, at step 365.

After receiving the encrypted data packet from the peripheral 315, the WDC 313 performs an L2 level forwarding process for the encrypted data packet (367). If the monitor mode is enabled on the WDC 313, the WDC 313 will not perform an intermediate decryption operation and a re-encryption operation for the data packet. Instead, the encrypted data packet is directly forwarded to the WD 311 based on the MAC address of the WD 311, at step 369.

Although FIG. 3 illustrates a transparent tunnel mode operation which shares an IP address and a PTK, and uses a monitor mode in a communication system supporting a wireless docking protocol according to an embodiment of the present invention, various changes could be made to the operations of FIG. 3 in accordance with embodiments of the present invention. For example, although shown as a series of operations, various operations in FIG. 3 could overlap, occur in parallel, occur in a different order, or occur multiple times in accordance with embodiments of the present invention.

In contrast to the example of FIG. 3, according to another embodiment of the present invention, the monitor mode may be enabled on an intermediate device as a GO or an AP rather than a third device other than a service set. More specifically, for actively routing a data packet from one device (e.g., a first device) to another device (e.g., a second device), the active mode is used rather than a data packet passive sniffing between the first device and the second device. According to an embodiment of the present invention, the monitor mode is used in order to optimize data routing between the first device and the second device, and a detailed description is provided later herein.

If a communication system is a communication system such as that illustrated in FIG. 1, a monitor mode is enabled on the WDC 113 as an intermediate device. In the present example, the first device is the WD 111, and the second device is the peripheral 115. The WD 111 and the peripheral 115 have independent Wi-Fi direct connections with the WDC 113, and the peripheral 115 may not directly pick up data packets from the WD 111. Accordingly, the peripheral 115 picks up the data packets from the WDC 113.

According to another embodiment of the present invention, the monitor mode is enabled on the WDC 113, enable pickup of data packets, of which a destination is the WDC 113. The WD 111 may encrypt data packets with the MAC address and the PTK of the peripheral 115 to transmit the encrypted data packets to the WDC 113. In this way, an IP address re-mapping operation, an additional encryption operation, and a decryption operation may be prevented.

Figure 4:
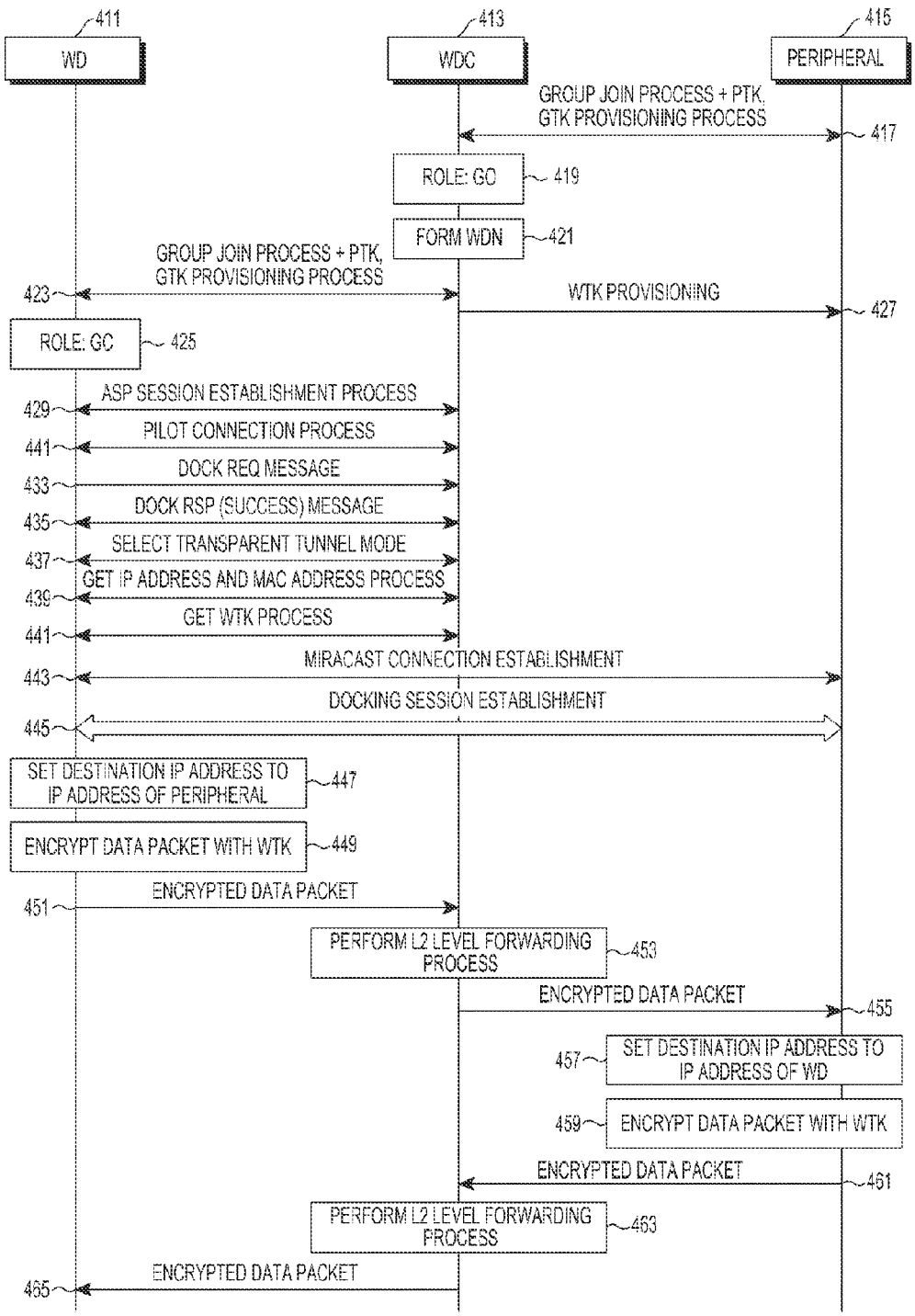
FIG. 4 is a diagram illustrating a transparent tunnel mode operation which shares an IP address, and uses a WTK based security scheme in a communication system supporting a wireless docking protocol according to an embodiment of the present invention.

FIG. 4 is a diagram illustrating a transparent tunnel mode operation that shares an IP address, and uses a WTK based security scheme in a communication system supporting a wireless docking protocol according to an embodiment of the present invention.

Referring to FIG. 4, the communication system includes a WD 411, a WDC 413, and a peripheral 415.

In a transparent tunnel mode operation that shares an IP address, and uses a WTK based security scheme, such as that illustrated in FIG. 4, a WTK is generated for a WDN and is used by all of the peripheral 415, the WD 411, and the WDC 413, so the WDC 413 does not perform an intermediate decryption operation and a re-encryption operation that are required when a PTK is used during a data packet is forwarded.

Further, in the transparent tunnel mode operation that shares the IP address and uses the WTK based security scheme, such as that illustrated in FIG. 4, a monitor mode/promiscuous mode does not need to be enabled, and a data packet forwarding operation may be performed in a similar manner as an operation in which a multicast message and a broadcast message that are encrypted with a GTK.

A detailed description of the transparent tunnel mode operation is provided as follows.

The peripheral 415 (e.g., a Miracast sink device) and the WD 411 (e.g., a WSB mouse) perform an association process with the WDC 413. In the present example, the WDC 413 is designated as a GO of a Wi-Fi direct P2P group, at step 419. The WDC 413 forms a WDN, at step 421. As a part of the association procedure, a group join process and a provisioning process for security keys such as a PTK, a GTK, and a WTK are performed between the WDC 413 and the peripheral 415, at step 417.

If the WD 411 discovers peripheral information and services provided by the WDC 413, a group join process and a provisioning process for security keys such as the PTK and the GTK are performed between the WD 411 and the WDC 413 as the GO, at step 423. The WD 411, as a group client device for the Wi-Fi direct P2P group, performs the group join process, at step 425.

After performing the group join process and the provisioning process for the security keys such as the PTK and the GTK, the WDC 413 provisions a WTK to the peripheral 415, at step 427.

The WD 411 docks with the WDC 413 to access services of a specific WDN based on additional information provided during a post association discovery process. The operation in which the WD 411 accesses the services of the WDN is described as follows.

An ASP session establishment process is performed between the WD 411 and the WDC 413, at step 429. A pilot connection process is performed between the WD 411 and the WDC 413, at step 431. After performing the pilot connection process, the WD 411 transmits a Dock Req message to the WDC 413, at step 433. After receiving the Dock Req message from the WD 411, the WDC 413 transmits a Dock Rsp message as a response message to the Dock Req message to the WD 411, at step 435. The Dock Rsp message includes a success parameter.

After detecting docking confirmation for the WDC 413, the WD 411 selects the transparent tunnel mode operation, at step 437. The WD 411 may detect the docking confirmation for the WDC 413 according to the reception of the Dock Rsp message including the success parameter from the WDC 413. According to an embodiment of the present invention, the WD 411 selects the transparent tunnel mode operation. However, the WDC 413 may select the transparent tunnel mode operation in accordance with embodiments of the present invention.

After the transparent tunnel mode operation is selected, the WD 411 gets parameters that are necessary for the transparent tunnel mode operation, i.e., an IP address and a MAC address of the peripheral 415, and the WTK of the WDN using a pilot protocol. More specifically, the WD 411 performs a Get IP & MAC addresses process with the WDC 413, at step 439, and performs a Get WTK process with the WDC 413, at step 441.

The WD 411 establishes a Miracast connection for the peripheral 415 using the IP address of the peripheral 415, at step 443. If the Miracast connection between the WD 411 and the peripheral 415 is established, an intermediate IP address re-mapping process that is required in certain other cases may be avoided.

After the Miracast connection is established between the WD 411 and the WDC 413, a docking session is established between the WD 411 and the peripheral 415, and packet data transmission/reception is enabled between the WD 411 and the peripheral 415, at step 445.

An operation of transmitting a data packet from the WD 411 to the peripheral 415 according to an embodiment of the present invention is described below.

If a data packet to be transmitted to the peripheral 415 occurs, the WD 411 sets a destination IP address of the data packet to an IP address of the peripheral 415, at step 447. The WD 411 encrypts the data packet with the WTK of the WDN to generate an encrypted data packet, at step 449. The WD 411 transmits the encrypted data packet to the WDC 413, at step 451.

The WDC 413 performs an L2 level forwarding process of the data packet for the peripheral 415 based on the MAC address of the peripheral 415 included in the encrypted data packet, at step 453. If the transparent tunnel mode operation in FIG. 4 is performed, the WDC 413 will not perform an intermediate decryption operation and a re-encryption operation for the data packet.

An operation of transmitting a data packet from the peripheral 415 to the WD 411 is performed in a similar manner as the operation of transmitting the data packet from the WD 411 to the peripheral 415. More specifically, the WDC 413 forwards the data packet to be transmitted from the peripheral 415 to the WD 411 from the peripheral 415 to the WD 411, based on the MAC address of the WD 411.

This operation of transmitting a data packet is described in further detail as follows.

If a data packet to be transmitted to the WD 411 occurs, the peripheral 415 sets a destination IP address of the data packet to an IP address of the WD 411, at step 457. The peripheral 415 encrypts the data packet with the WTK of the WDN to generate an encrypted data packet, at step 459. The peripheral 415 transmits the encrypted data packet to the WDC 413, at step 461.

After receiving the encrypted data packet from the peripheral 415, the WDC 413 performs an L2 level forwarding process for the encrypted data packet, at step 463. The encrypted data packet is directly forwarded to the WD 411 based on the MAC address of the WD 411, at step 465.

Although FIG. 4 illustrates a transparent tunnel mode operation which shares an IP address, and uses a WTK based security scheme in a communication system supporting a wireless docking protocol according to an embodiment of the present invention, various changes could be made to FIG. 4 in accordance with embodiments of the present invention. For example, although shown as a series of operations, various operations in FIG. 4 could overlap, occur in parallel, occur in a different order, or occur multiple times.

A transparent tunnel mode operation in consideration of two different cases is described as follows:

(1) when WSB data is tunneled:

It is possible that there are WSB peripherals associated with a WDC. Typically, a WSB hub must be implemented on the WDC to support these WSB peripherals. A transparent tunnel mode operation according to an embodiment of the present invention may be used for the WSB peripherals in order to improve performance. In this case, an operation similar to transparent tunnel mode operations described with reference to FIGS. 2 to 4 may be implemented for a WSB tunneling on the same lines as a Miracast tunneling.

(2) tunneling to wireless peripherals if wired peripherals are present:

A WDC may have a plurality of wired peripherals which are connected to the WDC while at the same time the WDC requires a transparent tunnel mode operation for the wireless peripherals. In this case, the wired peripherals require a termination point on the WDC (proxy) to convert a data packet which is wirelessly received for the respective wired protocol.

Further, WSB peripherals may operate using a hub on the WDC as the WSB peripherals perform the transparent tunnel mode operation. In a case that a parallel mode of operation including the transparent tunnel mode operation and the operation which uses the hub is supported, the WDC needs to support a plurality of physical interfaces or a plurality of virtual interfaces, one of the plurality of physical interfaces or the plurality of virtual interfaces may be implemented in the transparent tunnel mode, and other of the plurality of physical interfaces or the plurality of virtual interfaces may be implemented in the normal proxy tunnel mode.

Figure 5:
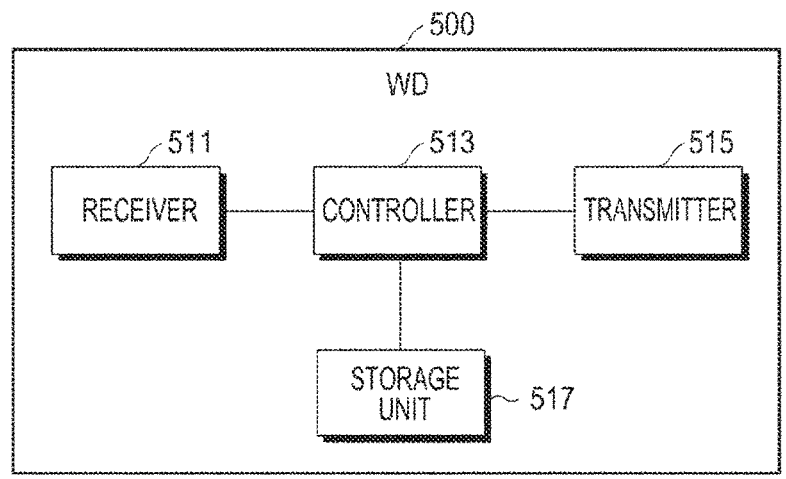
FIG. 5 is a diagram illustrating an internal structure of a WD in a communication system supporting a wireless docking protocol according to an embodiment of the present invention.

FIG. 5 is a diagram illustrating an internal structure of a WD in a communication system supporting a wireless docking protocol according to an embodiment of the present invention.

Referring to FIG. 5, a WD 500 includes a receiver 511, a controller 513, a transmitter 515, and a storage unit 517.

The controller 513 controls the overall operation of the WD 500. More specifically, the controller 513 controls the WD 500 to perform an operation related to a transparent tunnel mode operation. The operation related to the transparent tunnel mode operation is performed in the manner described with reference to FIGS. 1 to 4, and accordingly, a further description thereof is omitted herein.

The receiver 511 receives various messages, and the like from a WDC, a peripheral, and the like under a control of the controller 511. The various messages, and the like received in the receiver 511, are described herein above with reference to FIGS. 1 to 4, and accordingly, a further description thereof is omitted herein.

The transmitter 515 transmits various messages, and the like to the WDC, the peripheral, and the like under a control of the controller 511. The various messages, and the like transmitted in the transmitter 515 are described herein above with reference FIGS. 1 to 4, and accordingly, a further description thereof is omitted herein.

The storage unit 517 stores the various messages, and the like received in the receiver 511 and a program, various data, and the like necessary for the operation of the WD 500, specially, the operation related to the transparent tunnel mode operation.

While the receiver 511, the controller 513, the transmitter 515, and the storage unit 517 are described as separate processors, it is to be understood that this is merely for convenience of description. In other words, two or more of the receiver 511, the controller 513, the transmitter 515, and the storage unit 517 may be incorporated into a single processor.

Figure 6:
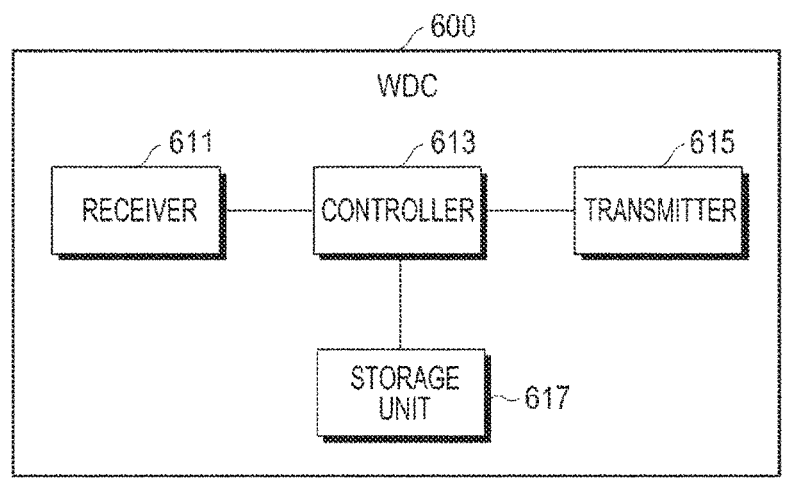
FIG. 6 is a diagram illustrating an internal structure of a WDC in a communication system supporting a wireless docking protocol according to an embodiment of the present invention.

FIG. 6 is a diagram illustrating an internal structure of a WDC in a communication system supporting a wireless docking protocol according to an embodiment of the present invention.

Referring to FIG. 6, a WDC 600 includes a receiver 611, a controller 613, a transmitter 615, and a storage unit 617.

The controller 613 controls the overall operation of the WDC 600. More specifically, the controller 613 controls the WDC 600 to perform an operation related to a transparent tunnel mode operation. The operation related to the transparent tunnel mode operation is performed in the manner described with reference to FIGS. 1 to 4, and accordingly, a further description thereof is omitted herein.

The receiver 611 receives various messages, and the like from a WD, a peripheral, and the like under a control of the controller 611. The various messages, and the like received in the receiver 611 are described herein above with reference to FIGS. 1 to 4, and accordingly, a description further thereof is omitted herein.

The transmitter 615 transmits various messages, and the like to the WD, the peripheral, and the like under a control of the controller 611. The various messages, and the like transmitted in the transmitter 615 are described herein above with reference to FIGS. 1 to 4, and accordingly, a further description thereof is omitted herein.

The storage unit 617 stores the various messages, and the like received in the receiver 611 and a program, various data, and the like necessary for the operation of the WDC 600, specially, the operation related to the transparent tunnel mode operation.

While the receiver 611, the controller 613, the transmitter 615, and the storage unit 617 are described as separate processors, it is to be understood that this is merely for convenience of description. In other words, at least two of the receiver 611, the controller 613, the transmitter 615, and the storage unit 617 may be incorporated into a single processor.

Figure 7:
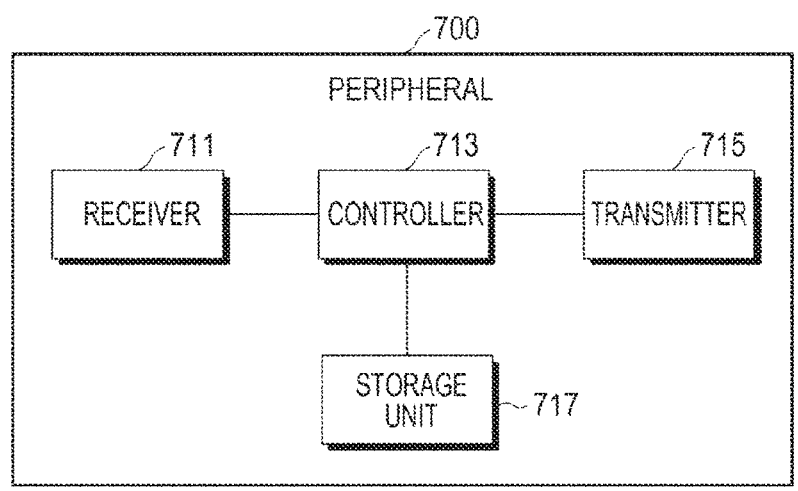
FIG. 7 is a diagram illustrating an internal structure of a peripheral in a communication system supporting a wireless docking protocol according to an embodiment of the present invention.

FIG. 7 is a diagram illustrating an internal structure of a peripheral in a communication system supporting a wireless docking protocol according to an embodiment of the present invention.

Referring to FIG. 7, a peripheral 700 includes a receiver 711, a controller 713, a transmitter 715, and a storage unit 717.

The controller 713 controls the overall operation of the peripheral 700. More specifically, the controller 713 controls the peripheral 700 to perform an operation related to a transparent tunnel mode operation. The operation related to the transparent tunnel mode operation is performed in the manner described with reference to FIGS. 1 to 4 and a description thereof will be omitted herein.

The receiver 711 receives various messages, and the like from a WD, a WDC, and the like under a control of the controller 711. The various messages, and the like received in the receiver 711 are described herein above with reference to FIGS. 1 to 4, and accordingly, a further description thereof is omitted herein.

The transmitter 715 transmits various messages, and the like to the WD, the WDC, and the like under a control of the controller 711. The various messages, and the like transmitted in the transmitter 715 are described herein above with reference to FIGS. 1 to 4, and accordingly, a further description thereof is omitted herein.

The storage unit 717 stores the various messages, and the like received in the receiver 711 and a program, various data, and the like necessary for the operation of the peripheral 700, specially, the operation related to the transparent tunnel mode operation.

While the receiver 711, the controller 713, the transmitter 715, and the storage unit 717 are described as separate processors, it is to be understood that this is merely for convenience of description. In other words, two or more of the receiver 711, the controller 713, the transmitter 715, and the storage unit 717 may be incorporated into a single processor.

Advantages according to embodiments of the present invention include the following examples. A transparent tunnel mode may support deployment of one hop protocol through two hop topology. The transparent tunnel mode may resolve latency issues related to IP address re-mapping which needs to be performed in a normal proxy mode of operation by directly providing a final destination IP address included in data packets and transparently tunneling the data packets to a final hop. The transparent tunnel mode may resolve latency issues which occur according to an intermediate decryption operation and a re-encryption operation on a WDC by directly encrypting a data packet with a security key of a peripheral/WTK of a WDN and transparently forwarding the data packet to a destination MAC address. Data packet forwarding occurs in an L2 level, so overhead of an upper layer may be prevented.

As is apparent from the foregoing description, embodiments of the present invention enable control of a transparent tunnel mode operation in a communication system supporting a wireless docking protocol.

Embodiments of the present invention enable control of a transparent tunnel mode operation to share wireless docking related information for peripherals in a communication system supporting a wireless docking protocol.

Embodiments of the present invention enable control of a transparent tunnel mode operation thereby a WD and peripherals share an IP address in a communication system supporting a wireless docking protocol.

Embodiments of the present invention enable control of a transparent tunnel mode operation thereby a WD and peripherals share a PTK in a communication system supporting a wireless docking protocol.

Embodiments of the present invention enable control of a transparent tunnel mode operation thereby a WD and peripherals share a WTK in a communication system supporting a wireless docking protocol.

Certain aspects of the present invention may also be embodied as computer readable code on a computer readable recording medium. A computer readable recording medium may include any data storage device that can store data, which can be thereafter read by a computer system. Examples of the computer readable recording media include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

It can be appreciated that a method and apparatus according to embodiments of the present invention may be implemented by hardware, software and/or a combination thereof. The software may be stored in a non-volatile storage, for example, an erasable or re-writable ROM, a memory, for example, a RAM), a memory chip, a memory device, or a memory Integrated Circuit (IC), or an optically or magnetically recordable non-transitory machine-readable, e.g., computer-readable, storage medium, e.g., a Compact Disk (CD), a Digital Versatile Disk (DVD), a magnetic disk, or a magnetic tape. A method and apparatus according to embodiments of the present invention may be implemented by a computer or a mobile terminal that includes a controller and a memory, and the memory may be an example of a non-transitory machine-readable, e.g., computer-readable, storage medium suitable to store a program or programs including instructions for implementing various embodiments of the present invention.

Embodiments of the present invention may include a program including code for implementing the apparatus and method as defined by the appended claims, and a non-transitory machine-readable, e.g., computer-readable, storage medium storing the program. The program may be electronically transferred via any media, such as communication signals, which are transmitted through wired and/or wireless connections, and their equivalents.

An apparatus according to an embodiment of the present invention may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present invention has been shown and described with reference to various embodiments thereof, it will be understood by those skilled in the art that various changes in form and details may be made therein without departing from the spirit and scope of the present invention as defined by the appended claims and their equivalents.

What is claimed is:

1. A method for controlling a transparent tunnel mode operation in a Wireless Dockee (WD) in a communication system supporting a wireless docking protocol, the method comprising:
performing a group join process and a provisioning process for security keys with a Wireless Docking Center (WDC);
accessing a Wireless Docking Environment (WDN);
selecting an operating mode between the WD and the WDC as a transparent tunnel mode;
receiving information for a peripheral; and
transmitting and receiving a data packet using the information for the peripheral with the peripheral if a media session is established between the WD and the peripheral.

2. The method of claim 1, wherein the security keys include a Pairwise Transient Key (PTK) and a Group Transient Key (GTK).

3. The method of claim 1, wherein accessing the WDN comprises:
performing an Application Service Platform (ASP) session establishment process with the WDC;
performing a pilot connection process with the WDC;
transmitting a Dock Request (Dock Req) message to the WDC; and
receiving a Dock Response (Dock Rsp) message as a response message to the Dock Req message from the WDC,
wherein the Dock Rsp message includes a success parameter.

4. The method of claim 1, wherein the information for the peripheral includes an Internet Protocol (IP) address, a Medium Access Control (MAC) address, and a Pairwise Transient Key (PTK) for the peripheral.

5. The method of claim 1, further comprising:
performing a process of getting information for the peripheral with the WDC;
requesting the WDC to enable a monitor mode and a promiscuous mode; and
transmitting and receiving a data packet using the information for the peripheral with the peripheral if a media connection and a docking session are established between the WD and the peripheral.

6. The method of claim 5, wherein transmitting and receiving the data packet using the information for the peripheral with the peripheral if the media connection and the docking session are established between the WD and the peripheral comprises:
setting a destination Internet Protocol (IP) address of a data packet to be transmitted to the peripheral to an IP address of the peripheral if the data packet occurs;
encrypting the data packet with a Pairwise Transient Key (PTK) of the peripheral; and
transmitting the encrypted data packet to the peripheral through the WDC.

7. A method for controlling a transparent tunnel mode operation in a Wireless Docking Center (WDC) in a communication system supporting a wireless docking protocol, the method comprising:
performing a group join process and a provisioning process for security keys with a Wireless Dockee (WD) and a peripheral;
performing a process related to an operation in which the WD accesses a Wireless Docking Environment (WDN) with the WD;
selecting an operating mode between the WD and the WDC as a transparent tunnel mode;
performing a process of getting information for a peripheral with the WD;
providing information for the WD to the peripheral;
enabling a monitor mode and a promiscuous mode upon receiving a message which requests to enable the monitor mode and the promiscuous mode; and
transmitting and receiving a data packet using the information for the WD and the information for the peripheral with the WD and the peripheral if a media connection and a docking session are established between the WD and the peripheral.

8. The method of claim 7, wherein the security keys include a Pairwise Transient Key (PTK) and a Group Transient Key (GTK).

9. The method of claim 7, wherein the performing of the process related to the operation in which the WD accesses the WDN with the WD comprises:
performing an Application Service Platform (ASP) session establishment process with the WD;
performing a pilot connection process with the WD;
receiving a Dock Request (Dock Req) message from the WD; and
transmitting a Dock Response (Dock Rsp) message as a response message to the Dock Req message to the WD, wherein the Dock Rsp message includes a success parameter.

10. The method of claim 7, wherein the information for the peripheral includes an Internet Protocol (IP) address, a Medium Access Control (MAC) address, and a Pairwise Transient Key (PTK) for the peripheral.

11. The method of claim 7, wherein the information for the WD includes a Pairwise Transient Key (PTK) of the WD.

12. The method of claim 7, wherein transmitting and receiving the data packet using the information for the WD and the information for the peripheral with the WD and the peripheral if the media connection and the docking session are established between the WD and the peripheral comprises:
receiving a data packet of which a destination Internet Protocol (IP) address is set to an IP address of the peripheral and is encrypted with a Pairwise Transient Key (PTK) of the peripheral;
performing a Layer 2 (L2) level forwarding process of the encrypted data packet for the peripheral based on a Medium Access Control (MAC) address of the peripheral; and
transmitting the L2 level forwarding processed data packet to the peripheral.

13. The method of claim 7, wherein transmitting and receiving the data packet using the information for the WD and the information for the peripheral with the WD and the peripheral if the media connection and the docking session are established between the WD and the peripheral comprises:
receiving a data packet of which a destination Internet Protocol (IP) address is set to an IP address of the WD and is encrypted with a Pairwise Transient Key (PTK) of the WD;
performing a Layer 2 (L2) level forwarding process of the encrypted data packet for the WD based on a Medium Access Control (MAC) address of the WD; and
transmitting the L2 level forwarding processed data packet to the WD.

14. A method for controlling a transparent tunnel mode operation in a peripheral in a communication system supporting a wireless docking protocol, the method comprising:
performing a group join process and a provisioning process for security keys with a Wireless Docking Center (WDC);
receiving information for a Wireless Dockee (WD) from the WDC;
transmitting and receiving a data packet using the information for the WD with the WD if a media connection and a docking session are established between the WD and the peripheral,
wherein the information for the WD includes a Pairwise Transient Key (PTK) of the WD.

15. The method of claim 14, wherein the security keys include a PTK and a Group Transient Key (GTK).

16. The method of claim 14, wherein transmitting and receiving the data packet using the information for the WD with the WD if the media connection and the docking session are established between the WD and the peripheral comprises:
setting a destination Internet Protocol (IP) address of a data packet to be transmitted to an IP address of the WD if the data packet occurs;
encrypting the data packet with the PTK of the WD; and
transmitting the encrypted data packet to the WD through the WDC.

17. A method for controlling a transparent tunnel mode operation in a Wireless Dockee (WD) in a communication system supporting a wireless docking protocol, the method comprising:
performing a group join process and a provisioning process for security keys with a Wireless Docking Center (WDC);
accessing a Wireless Docking Environment (WDN);
selecting an operating mode between the WD and the WDC as a transparent tunnel mode;

performing a process of getting information for a peripheral and information for the WDN with the WDC; and transmitting and receiving a data packet using the information for the WDN with the peripheral if a media connection and a docking session are established between the WD and the peripheral.

18. The method of claim 17, wherein the security keys include a Pairwise Transient Key (PTK) and a Group Transient Key (GTK).

19. The method of claim 17, wherein the accessing the WDN comprises:

performing an Application Service Platform (ASP) session establishment process with the WDC;

performing a pilot connection process with the WDC;

transmitting a Dock Request (Dock Req) message to the WDC; and receiving a Dock Response (Dock Rsp) message as a response message to the Dock Req message from the WDC, wherein the Dock Rsp message includes a success parameter.

20. The method of claim 17, wherein the information for the peripheral includes an Internet Protocol (IP) address and a Medium Access Control (MAC) address for the peripheral.

21. The method of claim 17, wherein the information for the WDN includes a WDN Transient Key (WTK).

22. The method of claim 17, wherein transmitting and receiving the data packet using the information for the WDN with the peripheral if the media connection and the docking session are established between the WD and the peripheral comprises:

setting a destination Internet Protocol (IP) address of a data packet to be transmitted to the peripheral to an IP address of the peripheral if the data packet occurs;

encrypting the data packet with a WDN Transient Key (WTK) of the WDN; and transmitting the encrypted data packet to the peripheral through the WDC.

23. A method for controlling a transparent tunnel mode operation in a Wireless Docking Center (WDC) in a communication system supporting a wireless docking protocol, the method comprising:

performing a group join process and a provisioning process for security keys with a Wireless Dockee (WD) and a peripheral;

provisioning information for a Wireless Docking Environment (WDN) to the peripheral;

performing a process related to an operation in which the WD accesses the WDN with the WD;

selecting an operating mode between the WD and the WDC as a transparent tunnel mode;

performing a process of getting information for a peripheral and information for the WDN with the WD; and transmitting and receiving a data packet using the information for the WDN with the WD and the peripheral if a media connection and a docking session are established between the WD and the peripheral.

24. The method of claim 23, wherein the security keys include a Pairwise Transient Key (PTK) and a Group Transient Key (GTK).

25. The method of claim 23, wherein the performing of the process related to the operation in which the WD accesses the WDN with the WD comprises:

performing an Application Service Platform (ASP) session establishment process with the WD;

performing a pilot connection process with the WD;

receiving a Dock Request (Dock Req) message from the WD; and transmitting a Dock Response (Dock Rsp) message as a response message to the Dock Req message to the WD, wherein the Dock Rsp message includes a success parameter.

26. The method of claim 23, wherein the information for the peripheral includes an Internet Protocol (IP) address and a Medium Access Control (MAC) address for the peripheral.

27. The method of claim 23, wherein the information for the WDN includes a WDN Transient Key (WTK).

28. The method of claim 23, wherein transmitting and receiving the data packet using the information for the WDN and the information for the peripheral with the WD and the peripheral if the media connection and the docking session are established between the WD and the peripheral comprises:

receiving a data packet of which a destination Internet Protocol (IP) address is set to an IP address of the peripheral and is encrypted with a WDN Transient Key (WTK) of the WDN;

performing a Layer 2 (L2) level forwarding process of the encrypted data packet for the peripheral based on a Medium Access Control (MAC) address of the peripheral; and transmitting the L2 level forwarding processed data packet to the peripheral.

29. The method of claim 23, wherein transmitting and receiving the data packet using the information for the WDN and the information for the peripheral with the WD and the peripheral if the media connection and the docking session are established between the WD and the peripheral comprises:

receiving a data packet of which a destination Internet Protocol (IP) address is set to an IP address of the WD and is encrypted with a WDN Transient Key (WTK) of the WDN;

performing a Layer 2 (L2) level forwarding process of the encrypted data packet for the WD based on a Medium Access Control (MAC) address of the WD; and transmitting the L2 level forwarding processed data packet to the WD.

30. A method for controlling a transparent tunnel mode operation in a peripheral in a communication system supporting a wireless docking protocol, the method comprising:

performing a group join process and a provisioning process for security keys with a Wireless Docking Center (WDC);

receiving information for a Wireless Docking Environment (WDN) from the WDC;

transmitting and receiving a data packet using the information for the WDN with a Wireless Dockee WD) if a media connection and a docking session are established between the WD and the peripheral, wherein the information for the WDN includes a WDN Transient Key (WTK).

31. The method of claim 30, wherein the security keys include a Pairwise Transient Key (PTK) and a Group Transient Key (GTK).

32. The method of claim 30, wherein transmitting and receiving the data packet using the information for the WDN with the WD if the media connection and the docking session are established between the WD and the peripheral comprises:

setting a destination Internet Protocol (IP) address of a data packet to be transmitted to an IP address of the WD if the data packet occurs;

encrypting the data packet with the WTK of the WDN; and transmitting the encrypted data packet to the WD through the WDC.

33. A Wireless Dockee (WD) in a communication system supporting a wireless docking protocol, the WD comprising:
a transmitter;
a receiver; and
a controller,
wherein the controller controls the transmitter and the receiver to perform a group join process and a provisioning process for security keys with a Wireless Docking Center (WDC) and access a Wireless Docking Environment (WDN), selects an operating mode between the WD and the WDC as a transparent tunnel mode, and controls the receiver to receive information for a peripheral with the WDC,
and
wherein the controllers controls the transmitter and the receiver to transmit and receive a data packet using the information for the peripheral with the peripheral if a media session is established between the WD and the peripheral.

34. The WD of claim 33, wherein the security keys include a Pairwise Transient Key (PTK) and a Group Transient Key (GTK).

35. The WD of claim 33, wherein the transmitter and the receiver perform an Application Service Platform (ASP) session establishment process with the WDC, and perform a pilot connection process with the WDC,
wherein the transmitter transmits a Dock Request (Dock Req) message to the WDC,
wherein the receiver receives a Dock Response (Dock Rsp) message as a response message to the Dock Req message from the WDC, and
wherein the Dock Rsp message includes a success parameter.

36. The WD of claim 33, wherein the information for the peripheral includes an Internet Protocol (IP) address, a Medium Access Control (MAC) address, and a Pairwise Transient Key (PTK) for the peripheral.

37. The WD of claim 33, wherein the transmitter sets a destination Internet Protocol (IP) address of a data packet to be transmitted to the peripheral to an IP address of the peripheral if the data packet occurs, encrypts the data packet with a Pairwise Transient Key (PTK) of the peripheral, and transmits the encrypted data packet to the peripheral through the WDC.

38. The WD of claim 33, wherein the controller controls the transmitter and the receiver to perform a process of getting information for the peripheral with the WDC,
wherein the transmitter requests the WDC to enable a monitor mode and a promiscuous mode, and
wherein the controller controls the transmitter and the receiver to transmit and receive data packet using the information for the peripheral with the peripheral if a media connection and a docking session are established between the WD and the peripheral.

39. A Wireless Docking Center (WDC) in a communication system supporting a wireless docking protocol, the WDC comprising:
a transmitter;
a receiver; and
a controller,
wherein the controller controls the transmitter and the receiver to perform a group join process and a provisioning process for security keys with a Wireless Dockee (WD) and perform a process related to an operation in which the WD accesses a Wireless Docking Environment (WDN) with the WD, selects an operating mode between the WD and the WDC as a transparent tunnel mode, and controls the transmitter and the receiver to perform a process of getting information for a peripheral with the WD,
wherein the transmitter provides information for the WD to the peripheral,
wherein the controller enables a monitor mode and a promiscuous mode if the receiver receives a message which requests to enable the monitor mode and the promiscuous mode, and
wherein the controller controls the transmitter and the receiver to transmit and receive a data packet using the information for the WD and the information for the peripheral with the WD and the peripheral if a media connection and a docking session are established between the WD and the peripheral.

40. The WDC of claim 39, wherein the security keys include a Pairwise Transient Key (PTK) and a Group Transient Key (GTK).

41. The WDC of claim 39, wherein the transmitter and the receiver perform an Application Service Platform (ASP) session establishment process with the WD, and perform a pilot connection process with the WD,
wherein the receiver receives a Dock Request (Dock Req) message from the WD,
wherein the transmitter transmits a Dock Response (Dock Rsp) message as a response message to the Dock Req message to the WD, and
wherein the Dock Rsp message includes a success parameter.

42. The WDC of claim 39, wherein the information for the peripheral includes an Internet Protocol (IP) address, a Medium Access Control (MAC) address, and a Pairwise Transient Key (PTK) for the peripheral.

43. The WDC of claim 39, wherein the information for the WD includes a Pairwise Transient Key (PTK) of the WD.

44. The WDC claim 39, wherein the receivers receives a data packet of which a destination Internet Protocol (IP) address is set to an IP address of the peripheral and is encrypted with a Pairwise Transient Key (PTK) of the peripheral,
wherein the controller performs a Layer 2 (L2) level forwarding process of the encrypted data packet for the peripheral based on a Medium Access Control (MAC) address of the peripheral, and
wherein the transmitter transmits the L 2 level forwarding processed data packet to the peripheral.

45. The WDC claim 39, wherein the receiver receives a data packet of which a destination Internet Protocol (IP) address is set to an IP address of the WD and is encrypted with a Pairwise Transient Key (PTK) of the WD,
wherein the controller performs a Layer 2 (L2) level forwarding process of the encrypted data packet for the WD based on a Medium Access Control (MAC) address of the WD, and
wherein the transmitter transmits the L2 level forwarding processed data packet to the WD.

46. A peripheral in a communication system supporting a wireless docking protocol, the peripheral comprising:
a transmitter;
a receiver; and
a controller, wherein the controller controls the transmitter and the receiver to perform a group join process and a provisioning process for security keys with a Wireless Docking Center (WDC), wherein the receiver receives information for a Wireless Dockee (WD) from the WDC, wherein the controller controls the transmitter and the receiver to transmit and receive a data packet using the information for the WD with the WD if a media connection and a docking session are established between the WD and the peripheral, and wherein the information for the WD includes a Pairwise Transient Key (PTK) of the WD.

47. The peripheral of claim 46, wherein the security keys include a PTK and a Group Transient Key (GTK).

48. The peripheral of claim 46, wherein the transmitter sets a destination Internet Protocol (IP) address of a data packet to be transmitted to an IP address of the WD if the data packet occurs, encrypts the data packet with the PTK of the WD, and transmits the encrypted data packet to the WD through the WDC.

49. A Wireless Dockee (WD) in a communication system supporting a wireless docking protocol, the WD comprising:

a transmitter;

a receiver; and a controller, wherein the controller controls the transmitter and the receiver to perform a group join process and a provisioning process for security keys with a Wireless Docking Center (WDC) and access a Wireless Docking Environment (WDN), selects an operating mode between the WD and the WDC as a transparent tunnel mode, and controls the transmitter and the receiver to perform a process of getting information for a peripheral and information for the WDN with the WDC and transmit and receive a data packet using the information for the WDN with the peripheral if a media connection and a docking session are established between the WD and the peripheral.

50. The WD of claim 49, wherein the security keys include a Pairwise Transient Key (PTK) and a Group Transient Key (GTK).

51. The WD of claim 49, wherein the controller controls the transmitter and the receiver to perform an Application Service Platform (ASP) session establishment process with the WDC and perform a pilot connection process with the WDC, wherein the transmitter transmits a Dock Request (Dock Req) message to the WDC, and wherein the receiver receives a Dock Response (Dock Rsp) message as a response message to the Dock Req message from the WDC, and wherein the Dock Rsp message includes a success parameter.

52. The WD of claim 49, wherein the information for the peripheral includes an Internet Protocol (IP) address and a Medium Access Control (MAC) address for the peripheral.

53. The WD of claim 49, wherein the information for the WDN includes a WDN Transient Key (WTK).

54. The WD of claim 49, wherein the transmitter sets a destination Internet Protocol (IP) address of a data packet to be transmitted to the peripheral to an IP address of the peripheral if the data packet occurs, encrypts the data packet with a WDN Transient Key (WTK) of the WDN, and transmits the encrypted data packet to the peripheral through the WDC.

55. A Wireless Docking Center (WDC) in a communication system supporting a wireless docking protocol, the WDC comprising:

a transmitter;

a receiver; and a controller, wherein the controller controls the transmitter and the receiver to perform a group join process and a provisioning process for security keys with a Wireless Dockee (WD) and a peripheral, wherein the transmitter provisions information for a Wireless Docking Environment (WDN) to the peripheral;

wherein the controller controls the transmitter and the receiver to perform a process related to an operation in which the WD accesses the WDN with the WD, selects an operating mode between the WD and the WDC as a transparent tunnel mode, and controls the transmitter and the receiver to perform a process of getting information for a peripheral and information for the WDN with the WD and transmit and receive a data packet using the information for the WDN with the WD and the peripheral if a media connection and a docking session are established between the WD and the peripheral.

56. The WDC of claim 55, wherein the security keys include a Pairwise Transient Key (PTK) and a Group Transient Key (GTK).

57. The WDC of claim 55, wherein the controller controls the transmitter and the receiver to perform an Application Service Platform (ASP) session establishment process and a pilot connection process with the WD, wherein the receiver receives a Dock Request (Dock Req) message from the WD, wherein the transmitter transmits a Dock Response (Dock Rsp) message as a response message to the Dock Req message to the WD, and wherein the Dock Rsp message includes a success parameter.

58. The WDC of claim 55, wherein the information for the peripheral includes an Internet Protocol (IP) address and a Medium Access Control (MAC) address for the peripheral.

59. The WDC of claim 55, wherein the information for the WDN includes a WDN Transient Key (WTK).

60. The WDC of claim 55, wherein the receiver receives a data packet of which a destination Internet Protocol (IP) address is set to an IP address of the peripheral and is encrypted with a WDN Transient Key (WTK) of the WDN, wherein the controller performs a Layer 2 (L2) level forwarding process of the encrypted data packet for the peripheral based on a Medium Access Control (MAC) address of the peripheral, and wherein the transmitter transmits the L2 level forwarding processed data packet to the peripheral.

61. The WDC of claim 55, wherein the receiver receives a data packet of which a destination Internet Protocol (IP) address is set to an IP address of the WD and is encrypted with a WDN Transient Key (WTK) of the WDN, wherein the controller performs a Layer 2 ( L2) level forwarding process of the encrypted data packet for the WD based on a Medium Access Control (MAC) address of the WD, and wherein the transmitter transmits the L2 level forwarding processed data packet to the WD.

62. A peripheral in a communication system supporting a wireless docking protocol, the peripheral comprising:
  a transmitter;
  a receiver; and
  a controller,
  wherein the controller controls the transmitter and the receiver to perform a group join process and a provisioning process for security keys with a Wireless Docking Center (WDC),
  wherein the receiver receives information for a Wireless Docking Environment (WDN) from the WDC,
  wherein the controller controls the transmitter and the receiver to transmit and receive a data packet using the information for the WDN with a Wireless Dockee WD) if a media connection and a docking session are established between the WD and the peripheral, and
  wherein the information for the WDN includes a WDN Transient Key (WTK).

63. The peripheral of claim 62, wherein the security keys include a Pairwise Transient Key (PTK) and a Group Transient Key (GTK).

64. The peripheral of claim 62, wherein the transmitter sets a destination Internet Protocol (IP) address of a data packet to be transmitted to an IP address of the WD if the data packet occurs, encrypts the data packet with the WTK of the WDN, and transmit the encrypted data packet to the WD through the WDC.

* * * * *